United States Patent
Jarrett et al.

(10) Patent No.: US 8,612,398 B2
(45) Date of Patent: Dec. 17, 2013

(54) CLEAN STORE FOR OPERATING SYSTEM AND SOFTWARE RECOVERY

(75) Inventors: Michael S. Jarrett, Kirkland, WA (US); Vishal Kapoor, Seattle, WA (US); Mathew J. McCormack, Melbourne (AU); Timothy D. Ebringer, Richmond (AU); Marc E. Seinfeld, Fort Lauderdale, FL (US); Jeremy D. Croy, Redmond, WA (US); Alvin Loh, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 253 days.

(21) Appl. No.: 12/722,426

(22) Filed: Mar. 11, 2010

(65) Prior Publication Data

US 2011/0225128 A1    Sep. 15, 2011

(51) Int. Cl.
*G06F 17/00* (2006.01)

(52) U.S. Cl.
USPC ........... 707/692; 175/234; 717/100; 717/168; 714/15

(58) Field of Classification Search
None
See application file for complete search history.

(56) References Cited

U.S. PATENT DOCUMENTS

| | | | |
|---|---|---|---|
| 5,732,275 A * | 3/1998 | Kullick et al. | 717/170 |
| 5,764,992 A * | 6/1998 | Kullick et al. | 717/170 |
| 6,016,553 A * | 1/2000 | Schneider et al. | 714/21 |
| 6,173,291 B1 | 1/2001 | Jenevein | |
| 6,199,178 B1 * | 3/2001 | Schneider et al. | 714/21 |
| 6,732,293 B1 * | 5/2004 | Schneider | 714/15 |
| 6,766,334 B1 * | 7/2004 | Kaler et al. | 1/1 |
| 7,440,971 B2 * | 10/2008 | Toebes et al. | 1/1 |
| 7,546,492 B2 * | 6/2009 | McCuller | 714/52 |
| 7,574,621 B2 * | 8/2009 | Childs et al. | 714/6.3 |
| 7,756,834 B2 * | 7/2010 | Masters et al. | 707/640 |
| 8,473,781 B1 * | 6/2013 | Hendricks et al. | 714/15 |
| 2002/0069363 A1 * | 6/2002 | Winburn | 713/200 |
| 2003/0079158 A1 * | 4/2003 | Tower et al. | 714/23 |
| 2004/0172424 A1 | 9/2004 | Edelstein | |
| 2005/0010576 A1 | 1/2005 | Ren | |
| 2005/0060607 A1 * | 3/2005 | Kano | 714/15 |
| 2005/0240815 A1 * | 10/2005 | Purkeypile et al. | 714/15 |
| 2006/0136389 A1 * | 6/2006 | Cover et al. | 707/3 |
| 2006/0242426 A1 * | 10/2006 | Schreyer et al. | 713/186 |
| 2007/0100905 A1 * | 5/2007 | Masters et al. | 707/201 |

(Continued)

OTHER PUBLICATIONS

Kernel Paradox—File Repair Software 4.03, published Mar. 12, 2008, http://www.safe-install.com/programs/kernel-paradox-file-repair-software.html.

(Continued)

*Primary Examiner* — Hung Le

(57) ABSTRACT

Systems, methods and apparatus for automatically identifying a version of a file that is expected to be present on a computer system and for automatically replacing a potentially corrupted copy of the file with a clean (or undamaged) copy of the expected version. Upon identifying a file on the computer system as being potentially corrupted, a clean file agent may perform an analysis based on the identity of the file and one or more other properties of the system to determine the version of the file that is expected to be present on the system. Once the expected version is identified, a clean replacement copy of the file may be obtained from a clean file repository by submitting a version identifier of the expected version. The version identifier may be a hash value, which may additionally be used to verify integrity of the clean copy.

11 Claims, 9 Drawing Sheets

(56) References Cited

U.S. PATENT DOCUMENTS

| | | |
|---|---|---|
| 2007/0168708 A1* | 7/2007 | McCuller .......................... 714/6 |
| 2007/0220306 A1 | 9/2007 | Childs |
| 2007/0271303 A1 | 11/2007 | Menendez |
| 2008/0086718 A1 | 4/2008 | Bostick |
| 2008/0155316 A1 | 6/2008 | Pawar |
| 2009/0055817 A1* | 2/2009 | Maj .............................. 717/173 |
| 2009/0106587 A1 | 4/2009 | Mambakkam |
| 2009/0158020 A1* | 6/2009 | Chen et al. ........................ 713/2 |
| 2009/0205045 A1* | 8/2009 | Horvath et al. ................. 726/23 |
| 2010/0031361 A1* | 2/2010 | Shukla ............................ 726/24 |
| 2010/0095380 A1* | 4/2010 | Fossen et al. ................... 726/24 |
| 2011/0173698 A1* | 7/2011 | Polyakov et al. ............... 726/23 |
| 2011/0179484 A1* | 7/2011 | Tuvell et al. ................... 726/22 |
| 2011/0219450 A1* | 9/2011 | McDougal et al. ............. 726/23 |
| 2011/0219451 A1* | 9/2011 | McDougal et al. ............. 726/23 |

OTHER PUBLICATIONS

Find Junk Files, copyright 2009, retrieved on Jan. 11, 2010, http://find-junk-files.software.informer.com/.

Registry Easy 2006, copyright 2008, retrieved on Jan. 11, 2010, http://www.softrecipe.com/System-Utilities/Registry-Tools/registry_easy.html.

How to Identify Damaged Software Products (prodreg), Jan. 2005, retrieved on Jan. 11, 2010, http://docs.sun.com/app/docs/doc/817-1985/swmgrpkgsgui-60?a=view.

PCT Search Report, Application No. PCT/US2011/027308, dated Oct. 27, 2011, 9 pages.

* cited by examiner

Report 400

405
Date:            May 1, 2009
Time:            23:00:00
Host_Name:       Host1
IP_Address:      192.168.5.130

410A
File_Name:       File1.exe
Last_Modified:   April 29, 2009, 16:59:59
Possible_Threat: Virus1
Hash:            633b8e2fb664e4c257df0b2f37f625ff 410B
File_Name:       File2.exe
Last_Modified:   Unknown
Possible_Threat: File Missing
Hash:            N/A 410C
File_Name:       File3.exe
Last_Modified:   April 4, 2009, 15:45:00
Possible_Threat: None
Hash:            d068a4b700f660879de6c57a64c762db

File Information Database 500

| Operating System | Service Pack | File Name | Expected Version |
|---|---|---|---|
| 505 | 510 | 515 | 520 |
| Windows Vista Enterprise | Service Pack 1 | File1.exe | 2.0 |
|  |  | File2.exe | 1.3 |
| ... |  |  |  |
| Windows Vista Enterprise | Service Pack 2 | File1.exe | 2.1 |
|  |  | File3.exe | 1.1 |
| ... |  |  |  |
| Windows 7 Professional | N/A | File1.exe | 3.0 |
| ... |  |  |  |

FIG. 5A

Hash Database 550

| File Name | Version | Hash |
|---|---|---|
| 555 | 560 | 565 |
| File1.exe | 2.0 | ff1e0283123d14cf8bd52ac449770017 |
| File2.exe | 1.3 | b445bf8b5da4cf880dd14e98c18c1bfa |
| File3.exe | 1.0 | 426d539b91225abc6f8858494bf658a2 |
| File3.exe | 2.0 | d068a4b700f660879de6c57a64c762db |
| File4.exe | 1.0 | 0330356a133d698961cd9889c337f6df |

FIG. 5B

CLEAN STORE FOR OPERATING SYSTEM AND SOFTWARE RECOVERY

BACKGROUND

Computer software, including operating system and application software, is often stored as files on a writable storage device, such as a hard disk drive of a computer system on which the software is to be executed. These files are vulnerable to damage or corruption that can be either accidental or intentional. For example, a user or an application program may accidentally delete or overwrite a file, or a sector of the hard disk may fail, resulting in the loss of some of the data in a file. Perhaps more frequently, the computer system may be subject to a malicious attack, in which an attacker may attempt to add, remove, or otherwise tamper with one or more software segments in a file to cause the computer system to behave in some unauthorized and/or undesirable manner. Such unwanted software is generally referred to as "malware," which may include viruses, worms, Trojan horses, adware, spyware, rootkits, and the like.

Several conventional techniques are available for detecting and restoring corrupted files (e.g., those infected by malware). For example, an anti-malware program may be installed on a computer system to scan the hard disk for any files that may have been corrupted by malware. Such scanning may take place according to a predetermined schedule or upon a user's request. Some anti-malware programs may also be capable of "real-time" protection, where files are scanned when they enter the computer system (e.g., when a user receives an email attachment or downloads a file from a web site), or when they are loaded into the system's active memory (e.g., when a user attempts to open or execute a file).

Once the anti-malware program identifies a file as being potentially corrupted by malware, a repair tool may be used to undo the damage to the file. The repair tool may be programmed to recognize specific patterns of damage that are known to be associated with certain types of malware, and may attempt to repair the corrupted file based on the type of malware that is detected. For example, the repair tool may recognize and remove software code that is characteristic of the detected malware.

An alternative approach is to monitor certain registered files (e.g., critical operating system files) for unauthorized modification, irrespective of the possibility of malware. For example, a small number of operating system components such as package installers may be authorized to modify the registered files, so that modification by any other software component may be deemed unauthorized.

When an unauthorized modification to a file is detected, the modified copy may be replaced immediately by a copy of the same file retrieved from a local cache on the computer system. If that particular file is not available from the local cache, the user may be prompted to provide an original copy of the file, for example, by providing an installation or recovery disk.

SUMMARY

Systems, methods and apparatus are provided for automatically identifying a version of a file that is expected to be present on a computer system and for automatically replacing a potentially corrupted copy of the file with a clean (or undamaged) copy of the expected version. Upon identifying a file on the computer system as being potentially corrupted, an analysis may be carried out based on the identity of the file and one or more other properties of the system to determine the version of the file that is expected to be present on the system. Once the expected version is identified, a clean replacement copy of the file may be obtained from a clean file repository by submitting a version identifier of the expected version.

In some embodiments, multiple heuristics may be employed to explore different aspects of available information relating to the file and the computer system. For example, heuristic rules may be developed according to known relationships between a file and other features of the computer system, such as properties of other files, system configurations and/or hardware features.

In some further embodiments, multiple sources of clean files may be probed to increase the likelihood that a desired clean file will be available from at least one of the sources. For example, a possible source may be a local cache of clean files that is built and/or maintained by a software agent capable of real-time monitoring of software installations. Another possible source may be a database of files maintained for backup purposes, which may include not only software files but also user data files. Yet another possible source may be a remote repository of clean files, for example, created and/or maintained for an enterprise network. Yet another possible source may be a remote repository of clean files created and/or maintained by a software and/or service provider.

In some embodiments, a hash value generated based on at least a portion of a file may be used to verify authenticity and/or integrity of a clean file before it is installed on the computer system. For example, a reference hash value corresponding to an expected version of a file may be obtained from a trusted source once the expected version is identified. Upon receiving a clean copy of the expected version, a hash value may be computed based on the received clean copy and compared against the reference hash value. Depending on the security properties of the hashing algorithm used to generated the hashes, a mismatch between the hashes may indicate that the received clean copy is not as expected (e.g., it may correspond to a different version of the file or have been tampered with), and a decision may be made not to install the clean copy.

The foregoing is a non-limiting summary of the invention, which is defined by the attached claims.

BRIEF DESCRIPTION OF DRAWINGS

The accompanying drawings are not intended to be drawn to scale. For purposes of clarity, not every component may be labeled in every drawing.

FIG. 4 shows an illustrative example of a report containing information regarding potentially corrupted files on a computer system, in accordance with some embodiments of the present disclosure.

FIG. 5A shows an illustrative example of a file information database that may be accessed by a clean file agent to identify an expected version of a file, in accordance with some embodiments of the present disclosure.

FIG. 5B shows an illustrative example of a hash database that maps file identifiers and alphanumerical version identifiers to hash values, in according with some embodiments of the present disclosure.

DETAILED DESCRIPTION

Figure 1:
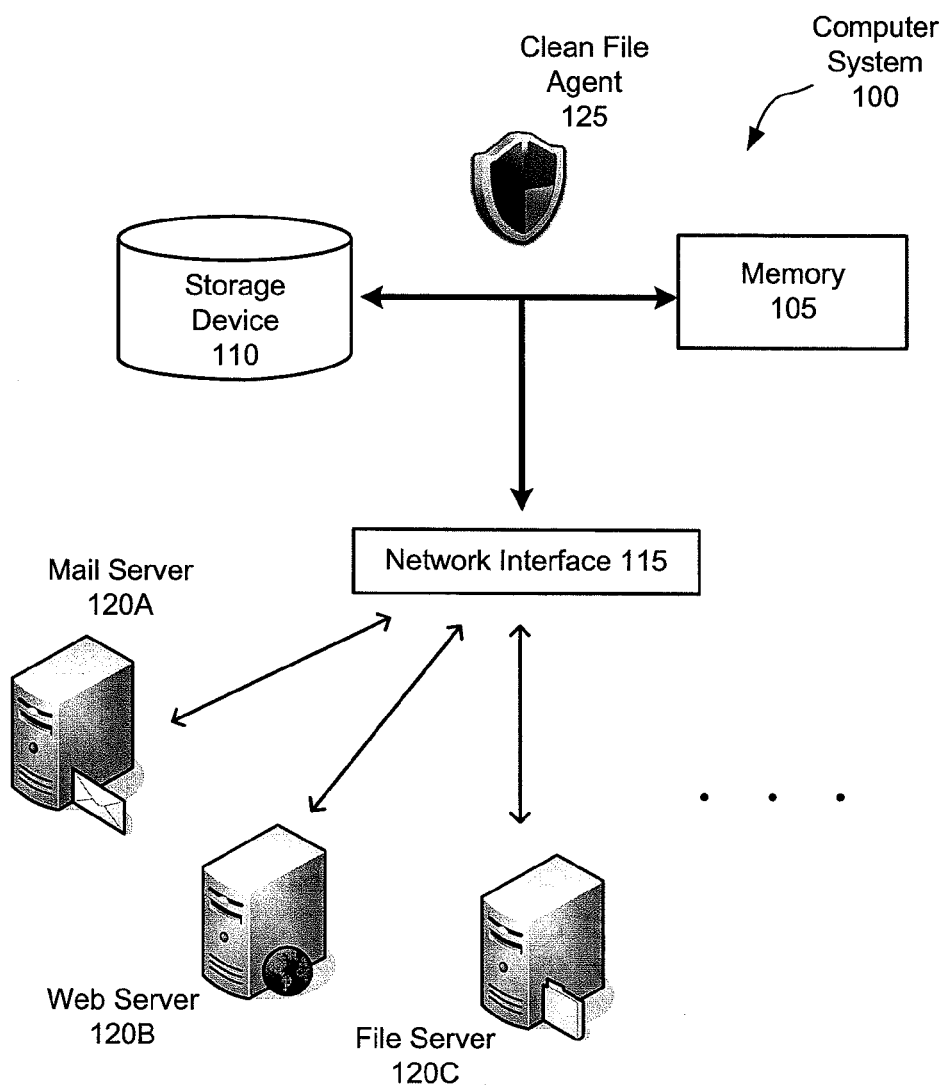
FIG. 1 shows an example of an illustrative computer system on which a clean file agent may execute, in accordance with some embodiments of the present disclosure.

The inventors have recognized and appreciated a number of disadvantages of the existing approaches to restoring corrupted files on a computer system.

For example, as malware attacks become increasingly numerous and sophisticated, it may be difficult and/or costly to develop repair routines that can reliably repair files corrupted by different types of malware. In some instances, a full repair may be impossible simply due to loss of data. As a result, unrepaired or incorrectly repaired files may remain on the computer system, rendering the corresponding software partially or completely non-functional. In the case of damaged operating system files, an unsuccessful repair may even lead to the entire system becoming inoperable and possibly requiring reinstallation. Such occurrences may negatively impact user experience and create significant burden for system administrators.

Earlier technologies that replace corrupted files using locally cached copies may also be limited in several aspects. For instance, the local cache may itself be susceptible to corruption due to either malicious attacks or system routines that remove cached files to save disk space. Additionally, software providers may routinely make available software updates including new versions of files to improve performance and/or fix bugs. As the updates are installed on the computer system, the local cache may become out-of-date, so that restoring corrupted files from the local cache may in effect revert the system to a previous state and may thereby create security risks, or even rendering the software non-functional due to incompatibilities. For example, a security patch released by a software provider may include a new version of a file designed to rectify a certain vulnerability on the computer system. After the security patch is installed, restoring the file from an out-of-date local cache may re-open the vulnerability that is supposed to have been closed by the security patch.

In short, the inventors have recognized and appreciated that a local cache as conventionally envisioned may be an unreliable source of clean files. Accordingly, in some disclosed embodiments, systems, methods and apparatus are provided for identifying a version of a file that is expected to be present on a computer system and for replacing a potentially corrupted copy of the file with a clean (or undamaged) copy of the expected version. For example, upon identifying a file on the computer system as being potentially corrupted, an analysis may be carried out based on the identity of the file and one or more other properties of the system to determine the version of the file that is expected to be present on the system. As a more specific example, the analysis may determine the expected version of the file based on the most recent authorized update of some relevant software (e.g., a software package to which the potentially corrupted file belongs). Once the expected version is identified, a clean replacement copy of the file may be obtained, for example, from a clean file repository by submitting a version identifier of the expected version.

Various techniques may be used to identify the expected version of a file on a computer system. For instance, multiple heuristics may be employed to exploit different aspects of available information relating to the file and the computer system. In some embodiments, one or more heuristics may be developed according to known relationships between different files on the system. As a more specific example, it may be known that a certain property X of a file A (e.g., the file A being of version 2.1) is necessarily accompanied by a certain property Y of a file B (e.g., the file B being of version 3.0 or higher). This type of information may be readily available when the files A and B are related in some way, for example, when they belong to the same software package for which a history of authorized updates is available. Thus, when the correct or expected version of the file A is known (e.g., when it can be verified that file A is not corrupted and is of version 2.1), the above relationship between the files A and B may be useful in determining the expected version of file B (e.g., by eliminating all versions lower than 3.0). Conversely, when the correct or expected version of the file B is known (e.g., when it can be verified that file B is not corrupted and is of version lower than 3.0), one or more inferences may be drawn regarding the expected version of file A (e.g., by eliminating version 2.1).

In some further embodiments, similar analyses may be carried out based on relationships between a file and other features of the computer system, such as system configurations and/or hardware features. For example, when it is known that the operation system is of a certain edition (e.g., Windows® Vista Enterprise) and/or a certain service pack has been installed (e.g., Windows® Vista Service Pack 2), the expected version of a file may be ascertained, or at least limited to a smaller set of possible options. As another example, when it is known that the computer system has a 64-bit processor, as opposed to a 32-bit processor, the expected version of a file in the operating system may be limited to only those associated with 64-bit versions of the operating system.

The inventors have recognized and appreciated that heuristic rules such as those discussed above may be sufficiently robust to permit meaning inferences even in situations where available information may be incomplete and/or unpredictable. By employing a sufficiently large collection of heuristics, it is likely that at least some heuristics will be applicable in any given situation, so that useful inferences may be drawn for identifying an expected version of a file even if it is not known a priori what information will be available.

In some embodiments, robustness may be further improved by the use of multiple sources of clean files. For example, unlike conventional techniques that rely on a single source of clean files (i.e., a local cache that may become corrupted and/or out-of-date), it is contemplated in some embodiments that multiple sources of clean files may be probed to increase the likelihood that a desired clean file will be available from at least one of the sources. For example, a possible source may be a local cache of clean files that is built and/or maintained by a software agent capable of real-time monitoring of software installations. Another possible source may be a database of files maintained for backup purposes, which may include not only software files but also user data files. Yet another possible source may be a remote repository of clean files, for example, created and/or maintained for an enterprise network.

The inventors have further recognized and appreciated that security may be improved using summary values for clean files. A summary value for a file may be any value representative of the content of the file in some suitable manner. In some embodiments, a summary value may be a hash value generated based on at least a portion of a file and may be used to verify authenticity and/or integrity of a clean file before it is installed on the computer system. For example, a reference hash value corresponding to an expected version of a file may be obtained from a trusted source once the expected version is identified. Upon receiving a clean copy of the expected version, a hash value may be computed based on the received clean copy and compared against the reference hash value. Depending on the security properties of the hashing algorithm used to generated the hashes, a mismatch between the hashes may indicate that the received clean copy is not as expected (e.g., it may correspond to a different version of the file or have been tampered with), and a decision may be made not to install the clean copy.

Following below are more detailed descriptions of various concepts related to, and embodiments of, inventive systems, methods and apparatus for identifying a version of a file that is expected to be present on a computer system and for replacing a potentially corrupted copy of the file with a clean copy of the expected version. It should be appreciated that various concepts introduced above and discussed in greater detail below may be implemented in any of numerous ways, as the disclosed concepts are not limited to any particular manner of implementation. For instance, the present disclosure is not limited to the particular arrangements of components shown in the various figures, as other arrangements may also be suitable. Such examples of specific implementations and applications are provided primarily for illustrative purposes.

FIG. 1 shows an example of an illustrative computer system 100 on which a clean file agent may execute, in accordance with some embodiments of the present disclosure. The computer system 100 may include one or more processors (not shown) and a memory 105 for storing processor-executable instructions. Additionally, the computer system 100 may include a storage device 110 (e.g., one or more disk drives) for storing software and/or data files and a network interface 115 (e.g., one or more network interface cards) for transmitting and/or receiving information over a network. For example, via the network interface 115, the computer system 100 may transmit information to, or receive information from, one or more remote servers, such as a mail server 120A, a web server 120B, a file server 120C, and the like. The received information may be stored in the storage device 110 and may, either immediately or at some later time, be loaded into the memory 105.

In some illustrative embodiments, a clean file agent 125 may be present on the computer system 100 and may be capable of identifying software files that are damaged, missing, or otherwise in need of replacement. For example, the clean file agent 125 may be programmed to scan the storage device 110 for any files that may have been corrupted (e.g., either accidentally or as a result of a malicious attack). The scanning may take place according to a predetermined schedule or upon a user's request. In some embodiments, the clean file agent 125 may also be capable of "real-time" monitoring of software files, for instance, by detecting and logging any authorized or unauthorized modifications to the files.

Instead of, or in addition to, actively collecting information regarding potentially corrupted files, the clean file agent 125 may receive information from another software component capable of scanning and/or monitoring software files. For instance, the clean file agent 125 may receive a summary report from an anti-malware component (not shown) identifying one or more files that are potentially corrupted by malware. An example of such a summary report is discussed in greater detail below in connection with FIGS. 3 and 4.

Having identified at least one potentially corrupted file (e.g., via a file name, a file system path and/or an identifier relating to a software component associated with the file), the clean file agent 125 may attempt to locate a clean copy of the file to replace the potentially corrupted copy. This, however, may not be straightforward in situations in which the file is available in multiple versions. As discussed above, a software provider may release the same software file in multiple different versions, for instance, in different editions of the software (e.g., home vs. professional editions, or editions designed for different operating systems), or in different patches and/or updates released at different times (e.g., to close newly discovered security vulnerabilities). In many cases, information regarding the correct version of the file that is expected to be present on the computer system 100 may not be readily available to the clean file agent 125.

Accordingly, in some disclosed embodiments, the clean file agent 125 may carry out an analysis to determine an expected version of a potentially corrupted file, so that a clean copy of the expected version may be obtained to replace the potentially corrupted copy. This analysis may be particularly advantageous in situations where replacing the potentially corrupted copy with an out-of-date or otherwise inappropriate clean copy may cause severe degradation in performance and/or security.

Figure 2:
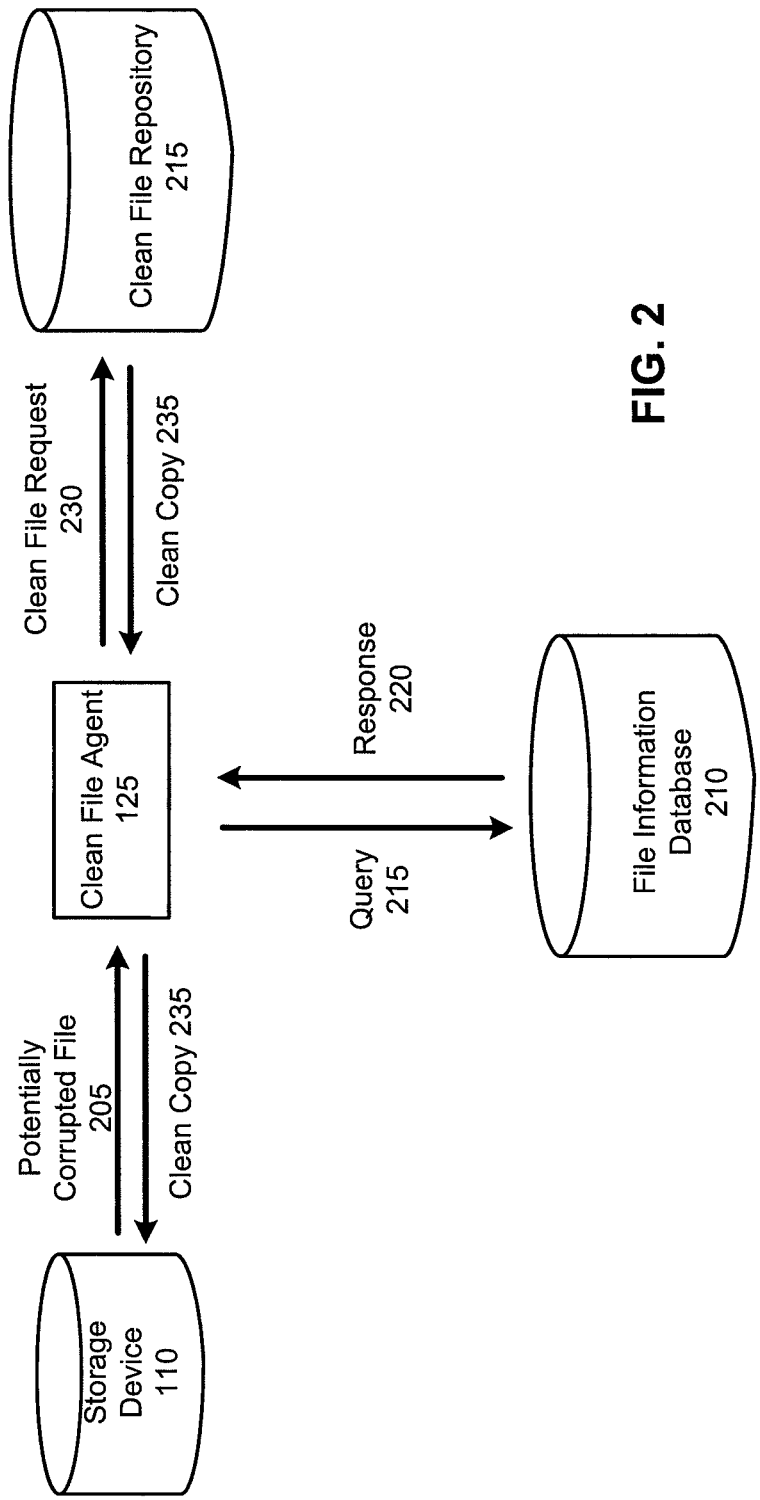
FIG. 2 shows an example in which a clean file agent uses information retrieved from a file information database to determine an expected version of a potentially corrupted file, in accordance with some embodiments of the present disclosure.

FIG. 2 shows an example in which the clean file agent 125 identifies a potentially corrupted file 205 that is present on the storage device 110 and uses information retrieved from a file information database 210 to determine an expected version of the potentially corrupted file, in accordance with some embodiments of the present disclosure. As discussed above, the expected version of a file on a particular computer system may be identified by exploring various ways in which the file may be related to other features of the computer system, such as files, software applications, operating systems, hardware, and the like. Thus, the file information database 210 may store any information that may be useful to the clean file agent 125 for exploring these relationships.

For instance, in some embodiments, the file information database 210 may store known relationships between different files on the system, such as, but not limited to, files associated with the same software component. In some further embodiments, the file information database 210 may store known relationships between files and operating system features, such as the name and edition of an operating system, a most recently installed service pack or update, and the like. In yet some further embodiments, the file information database 210 may store known relationships between files and hardware features, such as the types of one or more central processing units, sound cards, graphics cards, network interface cards, and the like. Any suitable combination of these and other types of information may be stored in the file information database, as the present disclosure is not limited in this respect. Also, the information may be stored in any suitable format, for example, according to a schema or relational model designed to facilitate version identification.

As shown in the example of FIG. 2, the clean file agent 125 may retrieve information from the file information database 210 by issuing one or more queries 215, which may be formulated according to information known to the clean file agent 125. For instance, the clean file agent 125 may formulate a query 215 according to some property of the potentially corrupted file 205, such as a file name, a file system path identifying a location at which the file is stored, and the like. The clean file agent 125 may also formulate the query 215 according to properties of system features other than the potentially corrupted file, such as other files, software components, operation system, hardware, and the like. For example, the query 215 may be of the form, "Given that files A and B both belong to Microsoft® Office 2007, and file A is of version 2.1, what are the possible versions of file B?" As another example, the query 215 may be of the form, "Given that the operating system is Windows® Vista Enterprise, and the most recently installed service pack is Windows® Vista Service Pack 2, what are the possible versions of file C?"

The file information database 210 may process the queries 215 received from the clean file agent 125 and issue one or more responses 220 according to applicable information stored in the file information database 210. For instance, the file information database 210 may identify and apply one or more rules based on the information provided in a query. As a more specific example, the file information database 210 may, in response to the first illustrative query described above, identify an applicable rule specifying that a certain property X of a file A (e.g., the file A being of version 2.0 or higher) is necessarily accompanied by a certain property Y of the file B (e.g., the file B being of version 3.0 or higher). This rule may be derived from some relevant release history (e.g., the release history of Microsoft® Office 2007), which may be stored in the file information database 210.

Applying the identified rule according to the information regarding file A given in the query (e.g., the version of file A is 2.1), the file information database 210 may issue a response regarding file B (e.g., the version of file B is likely to be 3.0 or higher). Similarly, with respect to the second illustrative query above, the file information database 210 may identify an applicable rule specifying that the version of file C is likely to be at least the particular version contained in the most recently installed service pack (e.g., Windows® Vista Service Pack 2), and may issue a response accordingly.

Upon receiving a response from the file information database 210, the clean file agent 125 may examine the response to determine whether an expected version has been identified definitively. For instance, as demonstrated in the above examples, a response may sometimes identify a range of versions (e.g., version 3.0 or higher), which may not be sufficient for the clean file agent 125 to uniquely determine the expected version. In that situation, the clean file agent 125 may issue another query to the file information database 210 based on some other known aspects of the potentially corrupted file 205 and/or the computer system. The later query may be dynamic, in that it may be formulated based on an earlier response from the file information database 210. For example, the later query may take into account the limited range of versions identified in the earlier response.

Thus, in some embodiments, the clean file agent 125 may issue multiple queries to the file information database 210 until a unique expected version is identified, or until some other stopping condition is satisfied, such as when a predetermined number of queries have been made or when the clean file agent 125 has exhausted all known information. In the latter cases, the clean file agent 125 may generate a failure report or message to notify a user or system administrator of the inconclusive result.

If the clean file agent 125 is able to uniquely determine an expected version of the potentially corrupted file 205, the clean file agent 125 may request a clean copy from a clean file repository 215. As shown in the example of FIG. 2, the clean file agent may generate a clean copy request 230, for example, based on a suitable identifier for the expected version. In response, the clean file repository 215 may return a clean copy 235 corresponding to the requested version to the clean file agent 125, which may replace the potentially corrupted copy on the storage device 110 with the received clean copy 235. Depending on system security settings and/or user preferences, the replacement may occur immediately upon receipt of the clean copy, or at a later time (e.g., the clean file agent may schedule installation of the clean copy during the next reboot of the system). For example, if the potentially corrupted file is a critical operating system file, the clean file agent may proceed to immediately install the clean copy, either silently or with user permission.

Although various examples of inventive features have been discussed above in connection with FIG. 2, it should be appreciated that the examples are provided solely for purposes of illustration, and that the present disclose is not limited to these specific examples. For example, although FIG. 2 shows only one file information database, a clean file agent may in other embodiments obtain information from multiple file information databases. Likewise, a clean file agent may contact multiple clean file repositories in its attempt to locate a suitable clean copy, which may increase the likelihood of successfully obtaining a clean copy.

Furthermore, the file information database and/or the clean file repository may be implemented in any suitable manner, as the present disclosure is not limited in that respect. For instance, the file information database and/or the clean file repository may reside on the local computer system, and may be maintained by a clean file agent or some other suitable local agent. Alternatively, the file information database and/or the clean file repository may be resided on a remote computer system (e.g., as a hosted service on a cloud server) and may communicate with a clean file agent via one or more networks. In some embodiments, the functionalities provided by the file information database and the clean file repository may even be implemented by a single data store. These and other illustrative implementations are described in greater detail below in connection with FIGS. 5A-B and 7.

Figure 3:
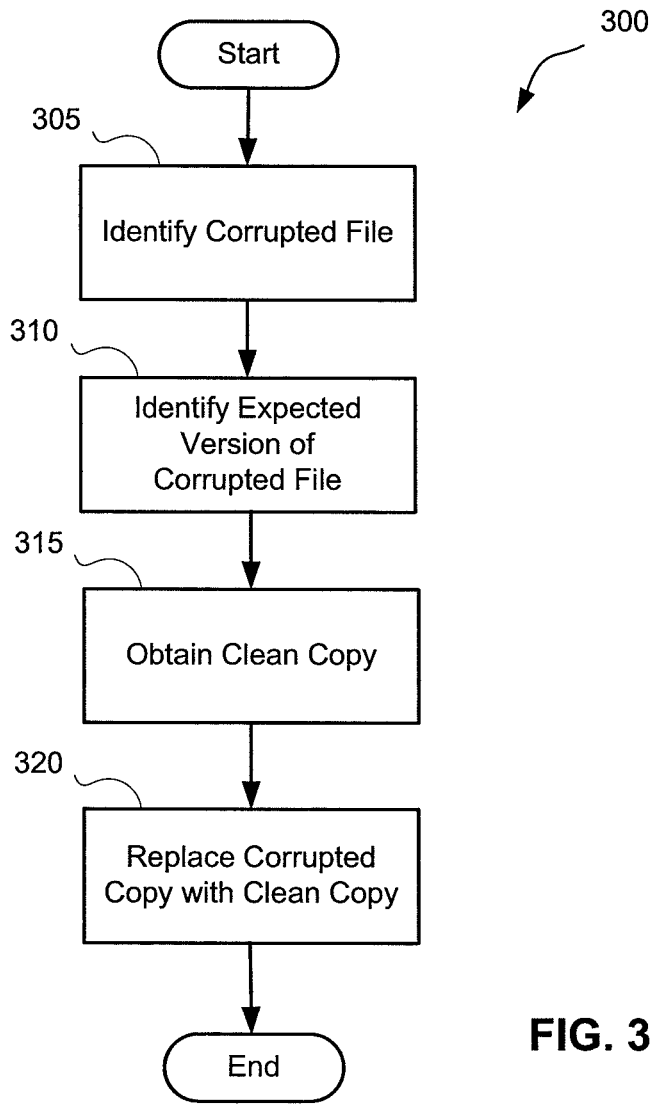
FIG. 3 shows an illustrative process that may be performed by a clean file agent to identify an expected version of a potentially corrupted file and to obtain a clean copy of the expected version, in accordance with some embodiments of the present disclosure.

FIG. 3 shows an illustrative process 300 that may be performed by a clean file agent (e.g., the clean file agent 125 shown in FIGS. 1-2) to identify an expected version of a potentially corrupted file and to obtain a clean copy of the expected version, in accordance with some embodiments of the present disclosure.

The process 300 may begin at act 305, where the clean file agent identifies a file as being potentially corrupted on a local computer system. As discussed above, the clean file agent may itself scan/monitor files on the computer system to discover files that are potentially corrupted. Alternatively, or additionally, the clean file agent may receive from another software component a report regarding files that are potentially corrupted. For example, the clean file agent may receive a summary report from an anti-malware software component, an example of which is shown in FIG. 4 and described below.

Although not required, the clean file agent may, in some embodiments, determine whether a potentially corrupted file should be restored using a clean copy. For example, the clean file agent may examine the manner in which the file is believed to be damaged and determine whether an attempt should be made to repair the file, instead of restoring the file using a clean copy. As more specific example, if the file is believed to have been corrupted by a certain known type of viruses, the clean file agent may determine whether a repair routine is available that is specifically designed to repair files damaged by that type of viruses. If such a repair routine is available, the clean file agent may first attempt to repair the file before proceeding to act 310 of the process 300 to identify an expected version, because the latter option may require significantly more resources (e.g., processor cycles and/or communication bandwidth). However, in some instances, a repair may not be feasible because of loss of data (e.g., part or all of the data in the file may be missing), in which case restoration from a clean copy may be a better option.

If the clean file agent determines that an analysis is desired to identify a version of the potentially corrupted file that is expected to be present on the computer system, the process 300 may proceed to act 310. As discussed above, the clean file agent may examine various aspects of the potentially corrupted file and/or the computer system in identifying the expected version. In some embodiments, the clean file agent may access one or more file information databases to explore correspondences between the potentially corrupted file and other features of the computer system. An example of a suitable file information database is shown in FIGS. 5A-B and described below. Additionally, an illustrative process that may be performed by the clean file agent to identify an expected version is discussed in greater detail in connection with FIG. 6.

Figure 7:
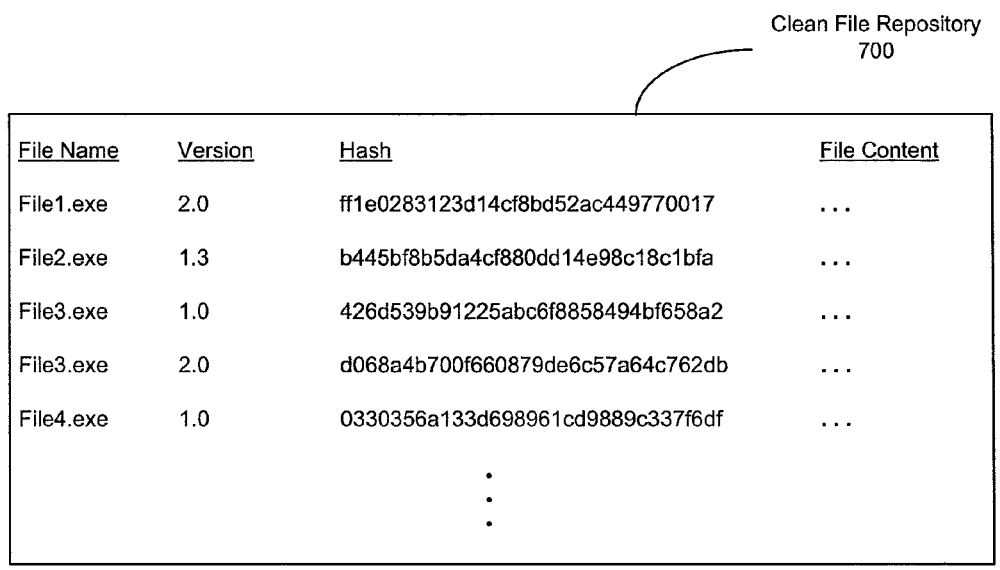
FIG. 7 shows an illustrative example of a clean file repository that may be contacted by the clean file agent to request a clean copy of a file, in accordance with some embodiments of the present disclosure.
Figure 8:
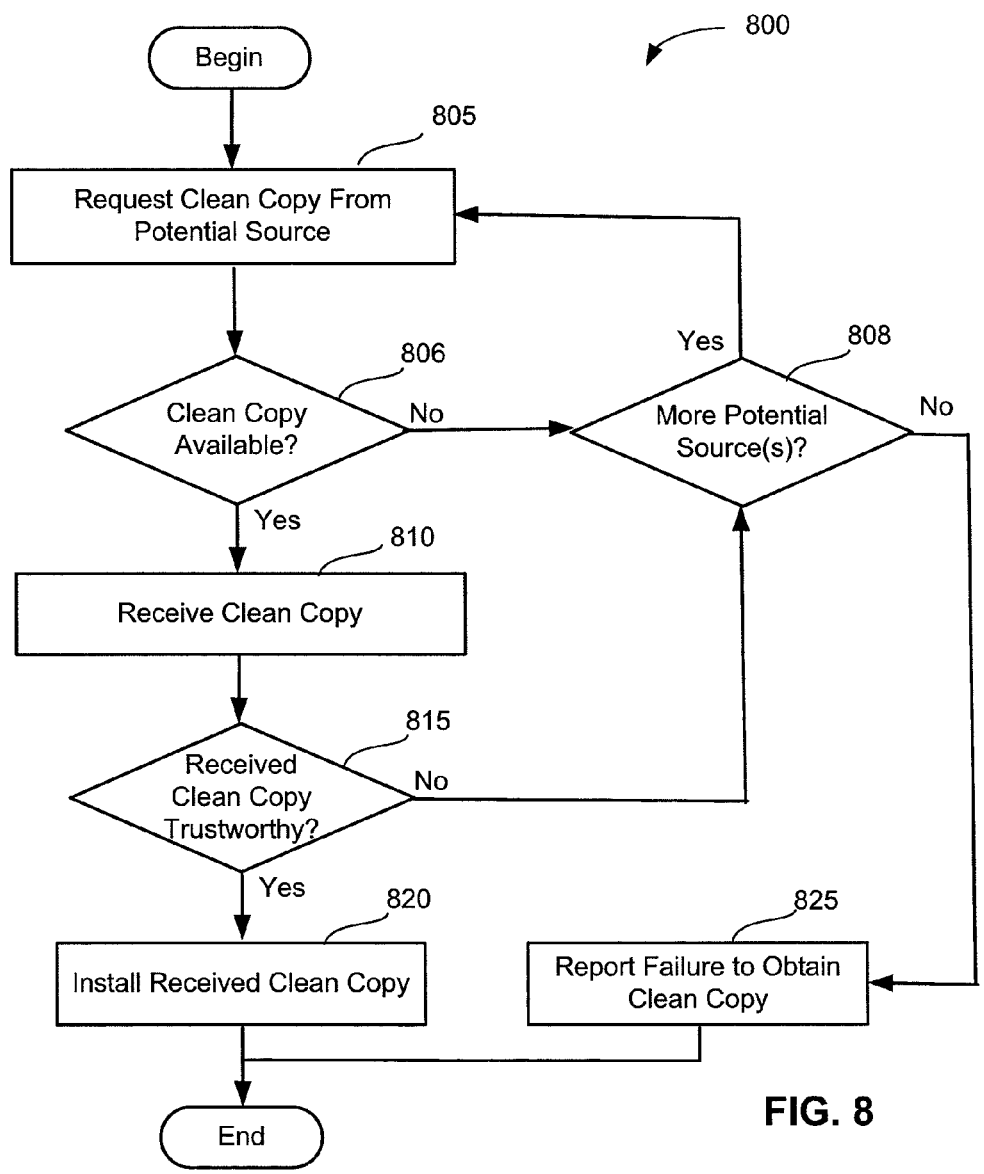
FIG. 8 shows an illustrative process that may be performed by a clean file agent to obtain a clean copy of a certain version of a file, in accordance with some embodiments of the present disclosure.

If the clean file agent is able to uniquely identify an expected version of the potentially corrupted file at act 310, the process 300 may proceed to act 315 to obtain a clean copy of the expected version. In some embodiments, the clean file agent may request a clean copy from one or more clean file repositories, such as the illustrative clean file repository 700 shown in FIG. 7. An illustrative process that may be performed by the clean file agent to request a clean copy is shown in FIG. 8 and described below.

If the clean file agent is able to obtain an appropriate clean copy at act 315, the process 300 may proceed to act 320 to install the clean copy, thereby replacing the potentially corrupted copy. As discussed in greater detail below in connection with FIG. 8, the clean file agent may, prior to actually installing the received clean copy, verify that the received clean copy is trustworthy or otherwise suitable for installation.

It should be appreciated that the high-level functionalities of the clean file agent outlined in FIG. 3 are merely exemplary, as other combinations of functionalities related to identifying expected versions and obtaining clean files may also be used. Additionally, the illustrated functionalities may be implemented in any suitable manner, as the present disclosure is not limited in this respect.

FIG. 4 shows an illustrative example of a report 400 containing information regarding potentially corrupted files on a computer system, in accordance with some embodiments of the present disclosure. The report 400 may be generated by a clean file agent that is capable of scanning and/or monitoring files on the computer system. Alternatively, the report 400 may be generated by an anti-malware software component and made available to the clean file agent. In either case, the clean file agent may use information contained in the report 400 to identify a potentially corrupted file as a candidate for restoration.

In the example of FIG. 4, the report 400 includes a header portion 405 and a plurality of entries 410A, 410B, 410C, . . . . The header portion 405 may contain any suitable administrative information, such as the date and time at which the report 400 was generated (e.g., "May 1, 2009" and "23:00:00") and/or one or more identifiers of a computer system to which the report 400 pertains (e.g., a host name "Host1" and an IP address "192.168.5.130"). The plurality of entries 410A, 410B, 410C, . . . may contain information regarding files on the computer system. For example, the entry 410A may correspond to the file "File1.exe," and may indicate that the file was last modified on Apr. 29, 2009 at 16:59:59 hours and that the file is potentially corrupted by a virus named "Virus1." Similarly, the entry 410B may correspond to the file "File2.exe," and may indicate that the file is unexpectedly missing and that the time at which the file was last modified (e.g., deleted) was not known. As a further example, the entry 410C may correspond to the file "File3.exe," and may indicate that the file was last modified on Apr. 4, 2009 at 15:45:00 hours and that the file is not believed to be corrupted.

The information contained in the report 400 may be used by a clean file agent to determine whether a certain file is potentially corrupted and, if so, which method of restoration is appropriate. For example, the report 400 may identify a type of damage to a file, which may allow the clean file agent to determine whether an attempt should be made to repair the file or to replace it with a clean copy of an expected version. As a more specific example, the entry 410A indicates that "File1.exe" is potentially corrupted by "Virus1," which may lead to a conclusion that "File1.exe" is to be repaired using a repair routine known to be effective against damages caused by "Virus1." On the other hand, the entry 410B indicates that "File2.exe" is missing, in which case it may be more appropriate to look for a replacement copy of the file "File2.exe."

Additionally, in some embodiments, some entries in the report 400 may also contain hash values generated based on the contents of the files (e.g., the entries 410A and 410C in FIG. 4). In the event that the file is identified to be corrupted (e.g., "File1.exe" in the entry 410A in FIG. 4), the corresponding hash value may be used for identifying an expected version of the file. For instance, there may be a heuristic rule that maps hash values and/or other auxiliary information to an expected version of a file. As a more specific example, if a type of malware is known to affect a particular file in a predictable manner, a heuristic rule may be created to map a triple of values consisting of a file name, a malware identifier and a hash value (e.g., "File1.exe," "Virus1" and "633b8e2fb664e4c257df0b2f37f625ff") to a version identifier for the expected version of the file (e.g., version "3.0"). Applying such a rule, a hash value included in the report 400 for a corrupted file may be used to quickly identify the expected version of the file. Alternatively, if such a rule is not yet available, it may be created once the expected version of the file is identified in some other suitable manner (e.g., as discussed below in connection with FIGS. 5A-B), and may be stored for future use.

While FIG. 4 shows specific examples of information that may be included in a report, it should be appreciated that other types of information may also be included and used by the clean file agent, as the present disclosure is not limited in this respect. Nor is the present disclosure limited to the particular format of the illustrative report 400 shown in FIG. 4. Any suitable combination of information regarding files in any suitable format may be collected and/or used by the clean file agent to perform any of the functionalities described herein.

FIG. 5A shows an illustrative example of a file information database 500 that may be accessed by a clean file agent to identify an expected version of a file, in accordance with some embodiments of the present disclosure. As discussed above in connection with FIG. 2, a clean file agent may issue queries to the file information database 500 to explore relationships between a file and various other features of the computer system, such as files, software applications, operating systems, hardware, and the like. The file information database 500 may store information relating to these features in such a manner that their interrelationships may be readily identified. For example, in some embodiments, the file information database 500 may be a relational database implemented using a suitable schema.

In the example shown in FIG. 5A, the file information database 500 stores information relating to various operating systems and service packs. For instance, for each operating system found in the file information database 500, an operating system name 505 may be stored (e.g., "Windows® Vista Enterprise," "Windows® 7 Professional," etc.), along with any available service pack identifiers 510 (e.g., "Service Pack 1," "Service Pack 2," etc.). A listing of file names 515 (e.g., "File1.exe," "File2.exe," . . . ) may be stored for each operating system and/or service pack combination, indicating that the listed files were released as part of the operating system and/or service pack combination. Each file in the listing may be associated with an expected version identifier 520, which may identify the version of the file that was released in the operating system and/or service pack combination.

Upon receiving a query, the file information database 500 may use the stored information to draw inferences regarding expected versions of files. For example, if the query specifies a certain operating system name (e.g., "Windows® Vista Enterprise") and/or a certain service pack identifier (e.g., "Service Pack 1"), it may be inferred that the expected version of a file (e.g., "File1.exe") may be at least the version released in the operating system and/or service pack combination (e.g., version "2.0" or higher). As another example, if the query specifies that a certain file (e.g., "File1.exe") has a particular version (e.g., version "2.1"), it may be inferred that a certain operating system and/or service pack combination (e.g., "Windows® Vista Enterprise" and "Service Pack 2") is likely to be present on the computer system, and therefore the expected version of another file (e.g., "File3.exe") may be at least the version released in the operating system and/or service pack combination (e.g., version "1.1" or higher).

Although not shown, the file information database 500 may store various other types of information in addition to, or instead of, information relating to operating systems and/or service packs. For example, as discussed above, the file information database 500 may store information regarding software applications (e.g., histories of updates) and/or hardware features. Other types of information may also be suitable, as the present disclosure is not limited in this respect.

The present disclosure is also not limited to any specific implementation of the information database 500. For instance, the information database 500 may reside on a local computer system (e.g., the same computer system where a clean file agent is executing) or on a remote computer system (e.g., a remote server of an enterprise network or a cloud server), or it may be distributed across multiple computer systems. Moreover, the file information database 500 may be built and/or maintained by different entities. For example, in some embodiments, the file information database 500 may be built and/or maintained by one or more local software agents, which may (but need not) include a clean file agent. These agents may update the file information database with any information available to them. For example, an agent capable of real time monitoring may provide updates regarding new software and/or operating system components that have been, or are scheduled to be, legitimately installed on the local computer system. In some further embodiments, the file information database 500 may be built and/or maintained by a system administrator and may be shared by one or more computer systems under the management of the system administrator. In yet some further embodiments, the file information database 500 may be built and/or maintained by a service provider, such as a software vendor.

Although not required, various measures may be implemented in connection with the file information database 500 to improve the security of information. For instance, in an embodiment in which the file information database 500 is local, precautions may be taken to prevent unauthorized tampering (e.g., by implementing an access control list to restrict write access to the file information database 500). In other embodiments, where the file information database 500 is hosted on a remote server, security may be improved by providing data integrity, authentication and/or secrecy. For example, the remote server may authenticate itself to a clean file agent, so that the clean file agent may receive data only from a trusted source. In another example, the clean file agent may authenticate itself to the remote server, so that the remote server may provide data only to an authorized agent. In yet another example, the remote server may provide data integrity, for example, by electronically signing the data (e.g., a response to a query) sent to a clean file agent. In yet another example, the remote server may provide data secrecy by encrypting the data sent to a clean file agent. Any combination of these and other techniques may be used to improve the security of information that may ultimately affect a clean file agent's analyses regarding expected versions of files.

Although alphanumeric identifiers are used in the example of FIG. 5A to indicate file versions, other types of identifiers may also be suitable. For instance, hash values generated based on contents of files may be used as file version identifiers instead of, or in addition to, alphanumeric identifiers. FIG. 5B shows an illustrative example of a hash database 550 that maps file identifiers and numerical version identifiers to hash values, in according with some embodiments of the present disclosure.

For instance, each file name 555 and version number 560 combination (e.g., "File1.exe" and version "2.0") may be mapped to a hash value 565 (e.g., "ff1e0283123d14cf8bd52ac449770017") generated at least in part using a portion of the corresponding version of the file (e.g., version "2.0" of the file "File1.exe"). These hash values may be generated using a common hash function (e.g., MD5, SHA1, etc.), or they may be generated using different hash functions, in which case additional metadata (not shown) may accompany each hash value to indicate which hash function was used for its generation.

A benefit of using hash values as version identifiers is added protection against intentional or unintentional tampering. Many hash functions are designed so that even a small change in the input data (e.g., flipping one bit) may cause a significant change in the resulting hash value (e.g., flipping roughly half of the bits). Also, given any file, it may be infeasible for a malicious attacker to modify the file without changing the hash value. Accordingly, a clean file agent may use a hash values both to identify a version of a file, and to verify that a purported clean copy is of the correct version of the correct file and has not been tampered with. Further details regarding hash version identifiers are discussed below in connection with FIGS. 7-8.

As with the file information database 500 of FIG. 5A, the hash database 550 may be implemented in various manners (e.g., locally or as a remote service) by various entities (e.g., local software agent, system administrator and/or software vendor). Various techniques such as access control list, digital signature, encryption, and the like may be also used to improve data security with respect to the hash database 550.

In some embodiments, a clean file agent may have access to both the file information database 500 of FIG. 5A and the hash database of 550 FIG. 5B, which may enable the clean file agent to obtain a hash value corresponding to an expected version of a file by first querying the file information database 500 to obtain an alphanumeric version identifier and then querying the hash database 550 of FIG. 5B using the alphanumeric version identifier to obtain a hash version identifier. Alternatively, a clean file agent may have access to a file information database that stores hash version identifier instead of, or in addition to, alphanumeric identifiers. As yet another alternative, the hash value database 550 may be built and/or maintained by a local software component capable of real time monitoring of files (e.g., an anti-malware component or the clean file agent itself), based on authorized installations of software files detected by the local software component. In this case, because the local software component has an accurate view of the state of the files, the hash value database 500 may include for at each file at most one hash value, corresponding to the version of the file that was most recently installed in an authorized manner.

Figure 6:
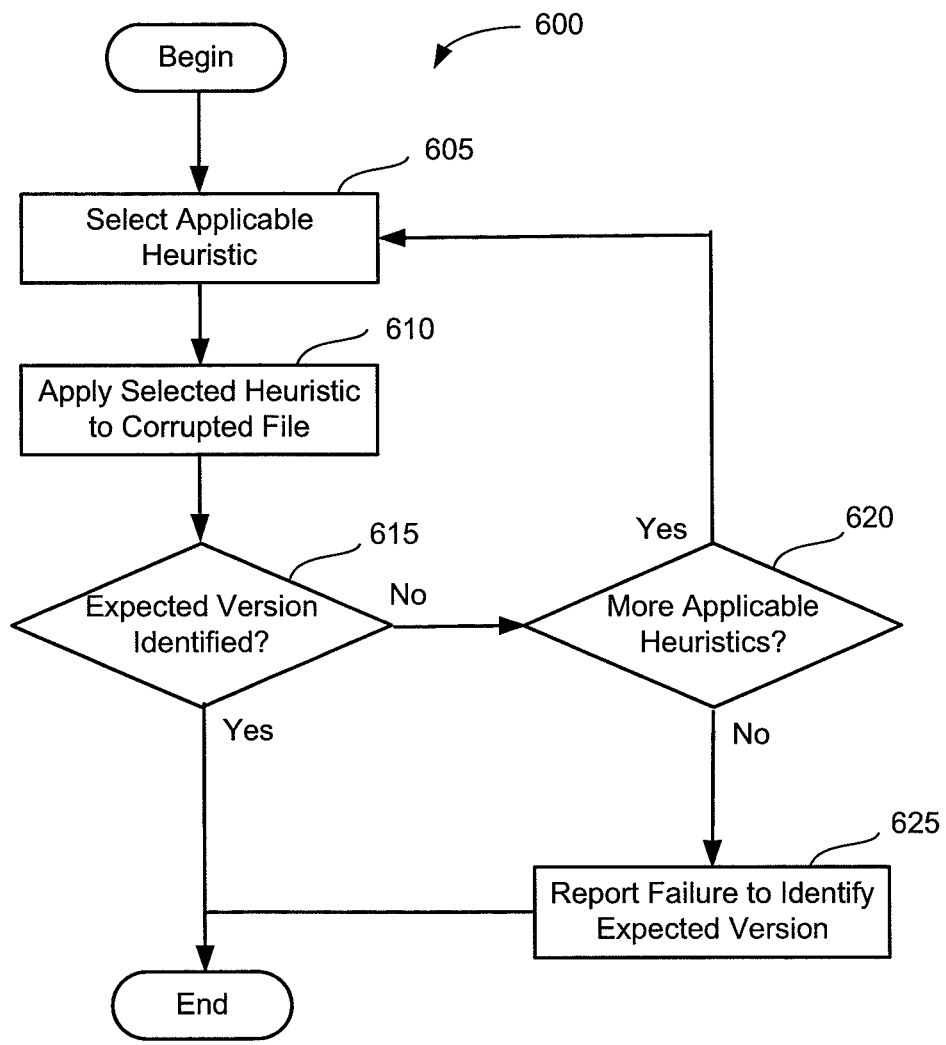
FIG. 6 shows an illustrative process that may be performed by a clean file agent to identifier a version of a file that is expected to be present on a computer system, in accordance with some embodiments of the present disclosure.

FIG. 6 shows an illustrative process 600 that may be performed by a clean file agent to identifier a version of a file that is expected to be present on a computer system, in accordance with some embodiments of the present disclosure. For example, the process 600 may be performed by the clean file agent 125 shown in FIG. 2 upon identifying the potentially corrupted file 205 and/or determining that the potentially corrupted file 205 is suitable for replacement using a clean copy.

In the example of FIG. 6, the process 600 may be viewed as a process for solving a constraint satisfaction problem. That is, the problem of identifying an expected version of a file may be formulated as a constraint satisfaction problem, where the expected version (e.g., as represented by some suitable identifier) may be viewed as a value subject to various constraints formulated using pieces of known information regarding the file (e.g., known relationships between the file and other features of the computer system). For example, at the beginning of the process 600, the expected version may have a full range of possible values (e.g., identifiers for all versions of the file ever released). With each application of a constraint (or heuristic rule) during the process 600, the range of possible values would either stay the same (e.g., where the application of the heuristic rule does not provide any new information) or shrink in size (e.g., where the application of the heuristic rule eliminates some possible values). The goal may be to reach a stage where the range contains only one value, which may be used by the clean file agent as the expected version of the file. However, it should be appreciated that such a goal may not be attainable in every situation (e.g., where information regarding the file is either incomplete or inaccurate).

The process 600 may begin at act 605 to select an applicable heuristic rule for the file being processed (e.g., the potentially corrupted file 205 in FIG. 2). This may be done based on any available information regarding the file, such as a name, a location at which the is stored, an identity of a software component to which the file is associated, a date and/or time at which the file was last modified and/or installed (e.g., in an authorized or unauthorized manner), an identify of a software agent that last modified and/or installed the file, and the like. For instance, if an accurate history of updates is available for the file, the date on which the file was last installed may be used to infer the version of the file likely to have been installed at that time.

One or more heuristic rules may also be based on known relationships between different files on the system. As a more specific example, it may be known that a certain property X of a file A (e.g., the file A being of version 2.1) is necessarily accompanied by a certain property Y of a file B (e.g., the file B being of version 3.0 or higher). This type of information may be readily available where the files A and B are related in some way, for example, where they belong to the same software package for which a history of authorized updates is available. Thus, when the version of the file A is known (e.g., when it is known that file A is of version 2.1), the above relationship between the files A and B may be useful in determining the expected version of file B (e.g., by eliminating all versions lower than 3.0 for file B). Conversely, when the version of the file B is known (e.g., when it is known that file B is of version lower than 3.0), one or more inferences may be drawn regarding the expected version of file A (e.g., by eliminating version 2.1 for file A).

Similarly, one or more heuristic rules may be based on relationships between the file and other features of the computer system, such as system configurations and/or hardware features. For example, when it is known that the operation system is of a certain edition (e.g., Windows® Vista Enterprise) and/or a certain service pack has been installed (e.g., Windows® Vista Service Pack 2), the expected version of a file may be ascertained, or at least limited to a smaller set of possible options (e.g., the version of the file released in that particular edition of the operation system and/or that particular service pack, or some higher version). As another example, when it is known that the computer system has a 64-bit architecture, as opposed to a 32-bit architecture, the expected version of a file in an operating system may be limited to only those versions associated with the 64-bit version of the operating system.

Returning to FIG. 6, the process 600 may proceed to act 610 to apply a selected heuristic rule to the potentially corrupted file. For instance, referring to the example of files A and B describe above, the clean file agent may determine whether file A is of version 2.1 and, if so, eliminate all versions lower than 3.0 for file B. If, on the other hand, file A is not of version 2.1, then no new information regarding file B may be gleaned.

As discussed above in connection with FIGS. 5A-B, the clean file agent may access a file information database (e.g., the file information database 500 of FIG. 5A) and/or a hash database (e.g., the hash database 550 of FIG. 5B). For example, the clean file agent may issue queries to these databases during acts 605 and 610. Responses to these queries may by used by the clean file agent in selecting an existing heuristic rule, developing a new heuristic rule, and/or applying a selected heuristic rule.

In some embodiments, the clean file agent may implement certain safety measures to provide a better guarantee that the expected version identified for a file does indeed correspond to the version that existed on the computer system immediately prior to the potential corruption. For instance, the clean file agent may adopt a policy that only verifiable information may be used to develop and/or apply heuristic rules. As a more specific example, the clean file agent may use information regarding a file only if the file can be verified to be undamaged (e.g., by an anti-malware software component). This may improve accuracy of any conclusion drawn regarding a potentially corrupted file based on a related file.

After applying the selected heuristic rule at act 610, the process 600 may proceed to act 615 to determine whether the set of possible versions for the potentially corrupted file has been narrowed down to only one remaining possible version. If so, the process 600 may end successfully and the clean file agent may use the remaining possible version as the expected version of the file. Otherwise, the process 600 may proceed to act 620 to determine whether there are more heuristic rules that may be applicable to the potentially corrupted file. If there is such a heuristic rule, the process 600 may return to act 605 to select a new heuristic rule. Otherwise, the process 600 may proceed to act 625 to report failure to identify an expected version for the potentially corrupted file. Although not shown, further actions may be taken to attempt to restore the corrupted file in some other manner, e.g., by prompting a user or system administrator to provide a replacement copy.

In some situations, it may also be possible that all possible versions have been eliminated when the process 600 reaches act 615, which may indicate that inconsistent information has been used in either developing or applying the heuristic rules. A failure report may be generated in this case to report the inconsistency.

It should be appreciated that the process 600 shown in FIG. 6 and described above is merely illustrative, as other processes may also be used by a clean file agent to identify an expected version of a potentially corrupted file. For example, although alphanumeric version identifiers have been used in describing the example of FIG. 6, other types of identifiers, such as hash identifiers, may also be used.

If the clean file agent succeeds in identifying an expected version, it may attempt to obtain a clean copy of the expected version to replace the potentially corrupted copy. In some embodiments, the clean file agent may contact one or more sources that may maintain clean copies of files to request the desired clean copy, for example, by providing a version identifier for the expected version as determined by the process 600 shown in FIG. 6. FIG. 7 shows an illustrative example of a clean file repository 700 that may be contacted by the clean file agent to request a clean copy of a file, in accordance with some embodiments of the present disclosure.

The clean file repository 700 may store file content for various files (e.g., "File1.exe," "File2.exe," etc.). For each file found in the clean file repository 700, one or more versions may be available and may be indexed using an appropriate version identifier. In the illustrated embodiment, either an alphanumeric identifier (e.g., versions "2.0," "1.3," etc.) or a hash identifier (e.g., "ff1e0283123d14cf8bd52ac449770017," "b445bf8b5da4cf880dd14e98c18c1bfa," etc.) may be used to request a particular version of a file. In some implementations, a hash identifier by itself (e.g., not accompanied by a file name) may be sufficient to identify the desired file content.

As with the file information database 500 of FIG. 5A and the hash database 550 of FIG. 5B, various techniques such as access control list, digital signature, encryption, and the like may be also used to improve data security with respect to the clean file repository 700. Also, the clean file repository 700 may be implemented in various manners (e.g., locally or as a remote service) by various entities (e.g., local software agent, system administrator and/or software vendor). Specific examples of a clean file repository include, but are not limited to:

a local cache of files built and/or maintained independently of the clean file agent, for example, by one or more other software components, such as Windows® DLLCache and/or Volume Shadow Copy Service, where the local file may, but need not, be stored on a removable storage such as a CD or DVD;

a local cache of files built and/or maintained by the clean file agent using, for example, copies of files collected by the clean file agent at install time or run time.

a network repository built and/or maintained by a system administrator;

a network repository built and/or maintained by a collection of software agents, which may reside on multiple different local computer systems and may upload copies of files to the network repository; and a hosted service (e.g., on a cloud server) provided by a software vendor.

Turning now to FIG. 8, an illustrative process 800 is shown that may be performed by a clean file agent to obtain a clean copy of a certain version of a file, in accordance with some embodiments of the present disclosure. For example, the process 800 may be performed by the clean file agent 125 shown in FIG. 2 upon identifying an expected version of the potentially corrupted file 205.

In the example shown in FIG. 8, the process 800 may begin at act 805 to submit a request for a clean copy to a potential clean file source (e.g., the clean file repository 700 shown in FIG. 7). As discussed above, the request may include any information sufficient to identity a desired version of a file, such as a file name, an alphanumeric version identifier and/or a hash version identifier. Also, depending on the implementation, an authentication procedure may be carried out to authenticate the clean file agent requesting a clean copy and/or the clean file source to which the request is directed.

At act 806, the potential clean file source contacted at act 805 may indicate whether the requested clean copy is available. If the requested copy is not available, the process 800 may proceed to act 808 to determine whether one or more other potential clean file sources for the desired clean copy may be identified. If so, the process may return to act 805 to submit a request to one of the identified sources. If no other potential clean file sources can be identified, the process 800 may proceed to act 825 to report failure to obtain a satisfactory clean copy. Although not shown, further actions may be taken to attempt to restore the corrupted file in some other manner, e.g., by prompting a user or system administrator to provide a replacement copy.

If it is determined at act 806 that the requested copy is available, the process 800 may receive at act 810 a clean copy from the clean file source contacted at act 805, after which the process 800 may proceed to act 815 to determine whether the received clean copy is trustworthy. For instance, in an embodiment where hash values are used as version identifiers, a new hash value may be computed based on a received clean copy and may be compared against the hash version identifier, so that the received clean copy is deemed trustworthy if and only if the hash values match.

If the received clean copy is determined to be trustworthy at act 815, the process 800 may proceed to act 820 to install the selected clean copy on the computer system, thereby replacing the existing copy that is potentially corrupted. Depending on the particular implementation, the installation may occur immediately or at the next reboot of the computer system, and it may be done silently or with user permission. For example, if a high level of risk is perceived (e.g., where the existing copy is potentially corrupted by a virus), the installation may proceed immediately and/or without obtaining user permission.

If the received clean copy is not determined to be trustworthy at act 815, the process 800 may return to act 808 to determine whether one or more other potential clean file sources for the desired clean copy may be identified, so that additional requests may be submitted accordingly.

Although not shown, the clean file agent may request additional clean copies from different clean file sources, even after receiving a clean copy that is deemed to be trustworthy. For example, multiple sources may be contacted serially, in parallel, or in any other suitable manner, so that multiple clean copies may be received and analyzed. For example, if multiple clean copies are received, they may be compared to detect any discrepancies. The absence of discrepancies may be taken as independent verification that the clean copy is trustworthy. If, on the other hand, a discrepancy is observed, none of the received clean copies may be deemed trustworthy. Alternatively, the clean file sources may be ranked according to their perceived trustworthiness, and a clean copy received from a source having a highest ranking may be selected as a trustworthy clean copy.

Various inventive aspects described herein may be used with any one or more computers and/or devices each having one or more processors that may be programmed to take any of the actions described above for identifying an expected version of a file and for obtaining a clean copy of the expected version.

The reference herein to a computer can include any device having a programmed processor, including a rack-mounted computer, a desktop computer, a laptop computer, a tablet computer or any of numerous devices that may not generally be regarded as a computer, which include a programmed processor (e.g., a PDA, an MP3 Player, a mobile telephone, wireless headphones, etc.).

Figure 9:
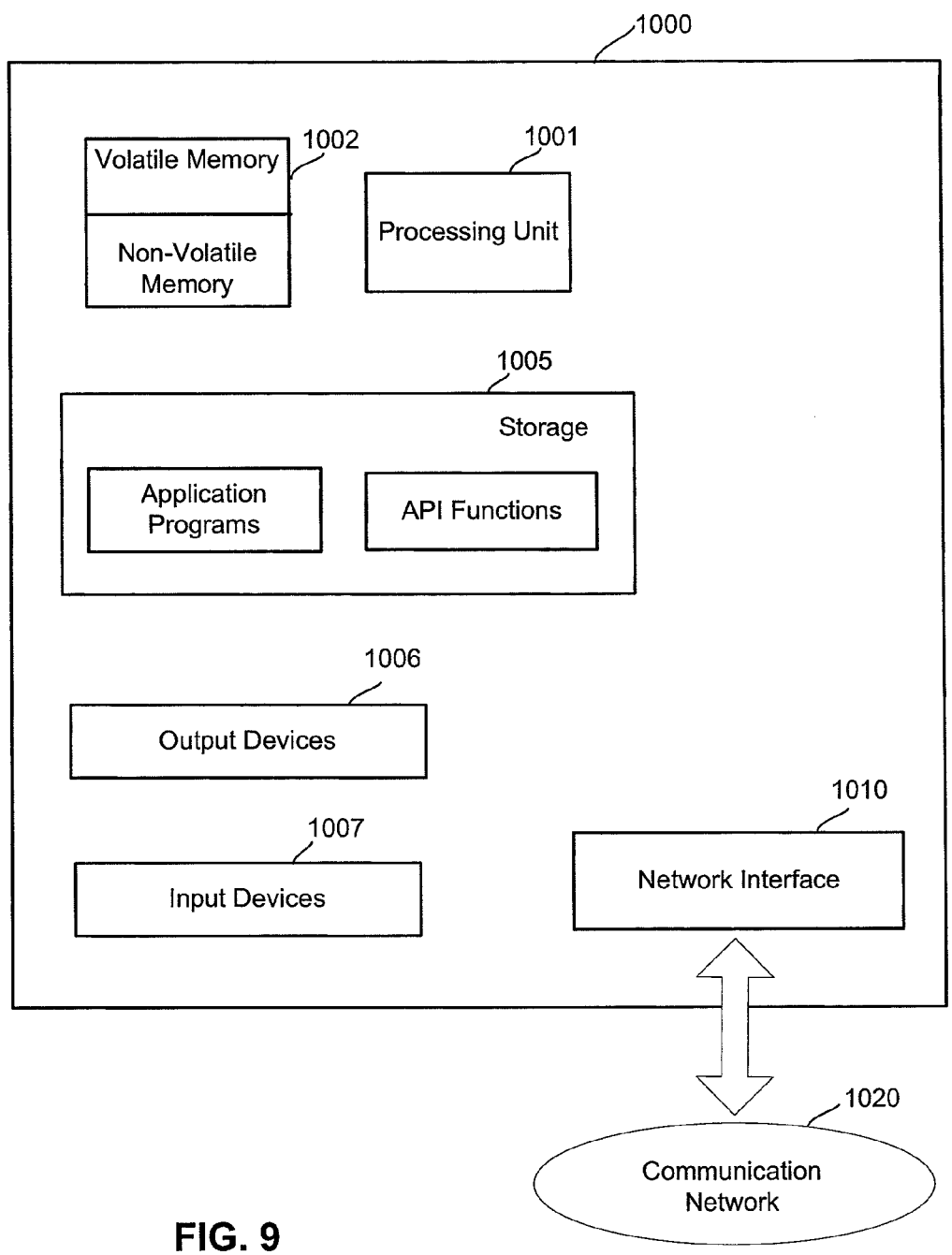
FIG. 9 shows, schematically, an illustrative computer on which various inventive aspects of the present disclosure may be implemented.

FIG. 9 shows, schematically, an illustrative computer 1000 on which various inventive aspects of the present disclosure may be implemented. The computer 1000 includes a processor or processing unit 1001 and a memory 1002 that may include volatile and/or non-volatile memory. The computer 1000 may also include storage 1005 (e.g., one or more disk drives) in addition to the system memory 1002. The memory 1002 may store one or more instructions to program the processing unit 1001 to perform any of the functions described herein. The memory 1002 may also one more application programs and/or Application Programming Interface (API) functions.

The computer 1000 may have one or more input devices and/or output devices, such as devices 1006 and 1007 illustrated in FIG. 9. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

As shown in FIG. 9, the computer 1000 may also comprise one or more network interfaces (e.g., the network interface 1010) to enable communication via various networks (e.g., the network 1020). Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a non-transitory computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A system for replacing a potentially corrupted copy of a file on a computer, the system comprising at least one processor programmed to:
   identify one or more properties of the computer relating to at least one feature of the computer other than the file;
   identify an existing version of the operating system on the computer;
   use the one or more properties of the computer and the existing version of the operating system to determine an expected version of the file by issuing a query to an information database that stores information relating to relationships between various operating systems and properties, the query formulated according to the one or more properties of the computer and the existing version of the operating system, and, in response to the query, the information database draws an inference regarding the expected version of the file;
   obtain a clean copy of the expected version of the file; and
   replace the potentially corrupted copy with the clean copy, wherein the expected version of the file is identified using a first hash value and wherein replace the potentially corrupted copy with the clean copy comprises:
      determine whether the clean copy is trustworthy by comparing the first hash value with a second hash value generated based on at least a portion of the clean copy; and
      replace the potentially corrupted copy with the clean copy only when it is determined that the clean copy is trustworthy.

2. The system of claim 1, wherein the file is a first file and the at least one feature of the computer comprises a second file, and wherein the at least one processor is further programmed to:
   identify an existing version of the second file on the computer; and
   use the existing version of the second file to determine the expected version of the first file.

3. The system of claim 1, wherein the at least one feature of the computer comprises a hardware feature, and wherein the at least one processor is further programmed to:
   identify a property of the hardware feature existing on the computer; and
   use the property of the hardware feature to determine the expected version of the file.

4. The system of claim 1, wherein the computer comprises the processor, and wherein the at least one processor is further programmed to obtain the clean copy from a remote clean file repository using an identifier of the expected version of the file.

5. The system of claim 1, wherein the at least one processor is further programmed to query a file identification database based on the one or more properties of the computer to determine the expected version of the file.

6. A computer-implemented method for identifying a version of a file that is expected to be present on a computer, the method comprising acts of:
   identifying one or more properties of the computer relating to at least one feature of the computer other than the file, wherein a copy of the file on the computer is potentially corrupted;
   identifying a property of the hardware feature existing on the computer;
   using the one or more properties of the computer and the property of the hardware feature to determine an expected version of the file by issuing a query to an information database that stores information relating to relationships between various operating systems and properties, the query formulated according to the one or more properties of the computer and the existing version of the operating system, and, in response to the query, the information database draws an inference regarding the expected version of the file;
   obtaining a clean copy of the expected version of the file from a clean file repository, wherein the expected version of the file is identified using a first hash value;
   determining whether the clean copy is trustworthy by comparing the first hash value with a second hash value generated based on at least a portion of the clean copy; and
   replacing the potentially corrupted copy with the clean copy only when it is determined that the clean copy is trustworthy.

7. The method of claim 6, wherein the file is a first file and the at least one feature of the computer comprises a second file, and wherein the method further comprises:
   identifying an existing version of the second file on the computer; and
   using the existing version of the second file to determine the expected version of the first file.

8. The method of claim 6, wherein the at least one feature of the computer comprises an operating system, and wherein the method further comprises:
   identifying an existing version of the operating system on the computer; and
   using the existing version of the operating system to determine the expected version of the file.

9. At least one computer storage device encoded with instructions that, when executed, perform a method for identifying a version of a file that is expected to be present on a computer, the method comprising acts of:
   identifying one or more properties of the computer relating to at least one feature of the computer other than the file wherein a copy of the file on the computer is potentially corrupted;

identifying an existing version of the operating system on the computer; and using the one or more properties of the computer and the existing version of the operating system to determine an expected version of the file by issuing a query to an information database that stores information relating to relationships between various operating systems and properties, and, in response to the query, the information database identifies and applies one or more rules based on information provided in the query, the information data based identifies the expected version of the file based on the one or more rules;

obtaining a clean copy of the expected version of the file from a clean file repository wherein the expected version of the file is identified using a first hash value;

determining whether the clean copy is trustworthy by comparing the first hash value with a second hash value generated based on at least a portion of the clean copy; and replacing the potentially corrupted copy with the clean copy only when it is determined that the clean copy is trustworthy.

10. The at least one computer storage medium of claim 9, wherein the file is a first file and the at least one feature of the computer comprises a second file, and wherein the method further comprises:

identifying an existing version of the second file on the computer; and using the existing version of the second file to determine the expected version of the first file.

11. The at least one computer storage medium of claim 9, wherein the at least one feature of the computer comprises a hardware feature, and wherein the method further comprises:

identifying a property of the hardware feature existing on the computer; and using the property of the hardware feature to determine the expected version of the file.

* * * * *